(12) United States Patent
Lei et al.

(10) Patent No.: US 12,361,765 B2
(45) Date of Patent: Jul. 15, 2025

(54) VEHICLE TOLL CHARGING METHOD, APPARATUS, DEVICE, SYSTEM, STORAGE MEDIUM AND PROGRAM PRODUCT

(71) Applicant: TENCENT TECHNOLOGY (SHENZHEN) COMPANY LIMITED, Guangdong (CN)

(72) Inventors: Yixue Lei, Shenzhen (CN); Peng Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/349,332

(22) Filed: Jul. 10, 2023

(65) Prior Publication Data
US 2023/0351810 A1 Nov. 2, 2023

Related U.S. Application Data

(63) Continuation of application No. PCT/CN2022/125761, filed on Oct. 17, 2022.

(30) Foreign Application Priority Data

Dec. 2, 2021 (CN) .......................... 202111463025.1

(51) Int. Cl.
G07B 15/06 (2011.01)
G06Q 20/32 (2012.01)
(52) U.S. Cl.
CPC ........... G07B 15/063 (2013.01); G06Q 20/32 (2013.01); G06Q 2240/00 (2013.01)
(58) Field of Classification Search
CPC ... G07B 15/063; G06Q 20/32; G06Q 2240/00
See application file for complete search history.

(56) References Cited

U.S. PATENT DOCUMENTS 10,708,745 B2 * 7/2020 Gravelle ............... G01S 13/878
2023/0092432 A1 * 3/2023 Clifford ............... G08G 1/0133
701/117

FOREIGN PATENT DOCUMENTS

CN 107221042 A * 9/2017 ............. G07B 15/06
CN 107481338 A 12/2017
(Continued)

OTHER PUBLICATIONS

Netshidzati, Ashley, Analysing the Implementation Process of Open Road Tolling in Gauteng, University of Johannesburg, Dec. 2013.*
(Continued)

Primary Examiner — Nathan Erb
(74) Attorney, Agent, or Firm — Sughrue Mion, PLLC

(57) ABSTRACT

A vehicle toll charging method include acquiring reference information of a vehicle in a current toll lane, the reference information including one or more of a vehicle type or driving information, determining toll information of the vehicle according to the reference information, transmitting the toll information to a charging terminal, acquiring a first indication message, the first indication message indicating that a toll transaction of the vehicle is successful, transmitting a first control instruction to a lane controller based on the first indication message to control a barrier of the current toll lane to lift and allow the vehicle to pass through the current toll lane, acquiring a second indication message, the second indication message indicating that the vehicle has passed through the current toll lane, and transmitting a second control instruction to the lane controller based on the second indication message to control the barrier to lower.

17 Claims, 5 Drawing Sheets

(56) References Cited

FOREIGN PATENT DOCUMENTS

| | | |
|---|---|---|
| CN | 108460846 A | 8/2018 |
| CN | 108717737 A | 10/2018 |
| CN | 109544713 A | 3/2019 |
| JP | 4331493 B2 * | 9/2017 ............. G07B 15/00 |
| JP | 2017207808 A * | 11/2017 ............. G07B 15/00 |
| KR | 10-2013-0055810 A | 5/2013 |

OTHER PUBLICATIONS

International Search Report of PCT/CN2022/125761 dated Dec. 16, 2022 [PCT/ISA/210].
Written Opinion of PCT/CN2022/125761 dated Dec. 16, 2022 [PCT/ISA/237].

* cited by examiner

VEHICLE TOLL CHARGING METHOD, APPARATUS, DEVICE, SYSTEM, STORAGE MEDIUM AND PROGRAM PRODUCT

CROSS-REFERENCE TO RELATED APPLICATIONS

This application is a continuation application of International Application No. PCT/CN2022/125761 filed on Oct. 17, 2022, which claims priority to Chinese Patent Application No. 202111463025.1, filed with the China National Intellectual Property Administration on Dec. 2, 2021, the disclosures of each of which being incorporated by reference herein in their entireties.

FIELD

The disclosure relates to the technical field of Internet of Vehicles, and in particular to a vehicle toll charging method, apparatus, device, system, storage medium and program product.

BACKGROUND

In the conventional lane charging system, the lane industrial personal computer needs to be disposed in each lane, causing the problem of complicated deployment of the lane industrial personal computers. Additionally, the lane industrial personal computer has limited computing capability, that is, the lane industrial personal computer has the problem of low billing efficiency.

SUMMARY

Embodiments of the disclosure provide a vehicle toll charging method, apparatus, device, system, storage medium and program product.

Some embodiments provide a vehicle toll charging method, performed by a server, the method including acquiring reference information of a vehicle in a current toll lane, the reference information comprising at least a vehicle type and driving information; determining toll information of the vehicle according to the reference information; transmitting the toll information to a charging terminal; acquiring a first indication message, the first indication message indicating that a toll transaction of the vehicle is successful; transmitting a first control instruction to a lane controller based on the first indication message to control a barrier of the current toll lane to rise and allow the vehicle to pass through the current toll lane; acquiring a second indication message, the second indication message indicating that the vehicle has passed through the current toll lane; and transmitting a second control instruction to the lane controller based on the second indication message to control the barrier to lower.

Some embodiments provide a vehicle toll charging apparatus, including: at least one memory configured to store program code; and at least one processor configured to read the program code and operate as instructed by the program code, the program code including: transaction code configured to cause at least one of the at least one processor to: acquire reference information of a vehicle in a current toll lane, the reference information comprising at least a vehicle type and driving information, determine toll information of the vehicle according to the reference information, and transmit the toll information to a charging terminal; and control code configured to cause at least one of the at least one processor to: acquire a first indication message, the first indication message indicating that a toll transaction of the vehicle is successful, transmit a first control instruction to a lane controller based on the first indication message to control a barrier of the current toll lane to rise and allow the vehicle to pass through the current toll lane, acquire a second indication message, the second indication message indicating that the vehicle has passed through the current toll lane, and transmit a second control instruction to the lane controller based on the second indication message to control the barrier to lower.

Some embodiments provide a computer readable storage medium, including instructions, the instructions, when run on a computer, causing the computer to perform the vehicle billing method.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
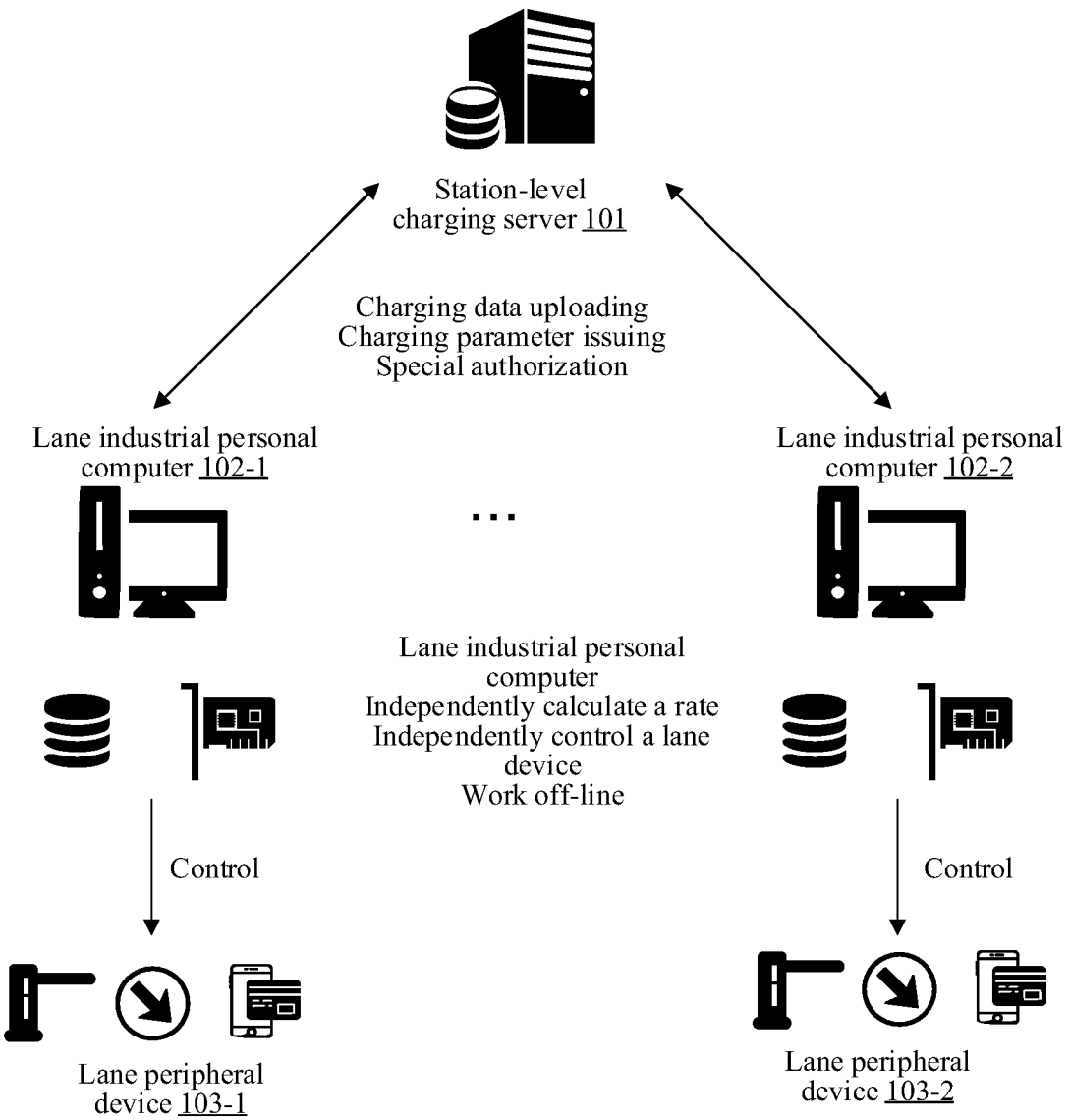
FIG. 1 is a schematic diagram of a conventional lane charging system.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

It is to be explained that, in the specification, claims, and the foregoing accompanying drawings, the terms "first", "second", and so on are intended to distinguish between similar objects rather than describing a specific order or a precedence order. It is to be understood that such used data is interchangeable where appropriate so that the embodiments of this application described here can be implemented in an order other than those illustrated or described here. Moreover, the terms "include", "have" and any other variants thereof mean to cover the non-exclusive inclusion, for example, a process, method, system, product, or server that includes a list of operations or units is not necessarily limited to those expressly listed operations or units, but may include other operations or units not expressly listed or inherent to such a process, method, system, product, or device.

In the following descriptions, related "some embodiments" describe a subset of all possible embodiments. However, it may be understood that the "some embodiments" may be the same subset or different subsets of all the possible embodiments, and may be combined with each other without conflict.

Some embodiments provide a vehicle charging method applied to a server, the method including the following operations: acquiring billing reference information of a vehicle to be charged; billing the vehicle to be charged according to the billing reference information to obtain charging information of the vehicle to be charged; and sending the charging information to a charging terminal; acquiring a first indication message, the first indication message being used for indicating that the vehicle to be charged is successfully charged according to the charging information; sending a first control instruction to a lane controller in response to the first indication message, the first control instruction being used for controlling a barrier to rise, so that the vehicle to be charged passes through a current lane; acquiring a second indication message, the second indication message being used for indicating that the vehicle to be charged has passed through the current lane; and sending a second control instruction to the lane controller in response to the second indication message, the second control instruction being used for controlling the barrier to fall.

Some embodiments provide a vehicle charging apparatus, including: a billing module and a control module; where the billing module is configured to: acquire billing reference information of a vehicle to be charged; bill the vehicle to be charged according to the billing reference information to obtain charging information of the vehicle to be charged; and send the charging information to a charging terminal; and the control module is configured to: acquire a first indication message, the first indication message being used for indicating that the vehicle to be charged is successfully charged according to the charging information; send a first control instruction to a lane controller in response to the first indication message, the first control instruction being used for controlling a barrier to rise, so that the vehicle to be charged passes through a current lane; acquire a second indication message, the second indication message being used for indicating that the vehicle to be charged has passed through the current lane; and send a second control instruction to the lane controller in response to the second indication message, the second control instruction being used for controlling the barrier to fall.

Some embodiments provide a server, including: a processor and a memory, the memory being configured to store a computer program, the processor being configured to invoke and run the computer program stored in the memory to perform the method as in a first aspect or various implementations thereof.

Some embodiments provide a vehicle billing system, including: a server configured to perform the method as in a first aspect or various implementations thereof, and a lane peripheral system.

Some embodiments provide a computer readable storage medium, including instructions, the instructions, when run on a computer, causing the computer to perform the vehicle billing method.

Some embodiments provide a computer program product, including computer program instructions, the computer program instructions causing a computer to perform the vehicle billing method.

Some embodiments provide a computer program, the computer program causing a computer to perform the vehicle charging method.

FIG. 1 shows a schematic diagram of the conventional lane charging system. A conventional lane charging system is completed based on lane peripheral devices and lane industrial personal computers. As shown in FIG. 1, a station-level charging server 101 may send charging parameters and special authorizations to lane industrial personal computers, lane industrial personal computer 102-1 and lane industrial personal computer 102-2. The lane industrial personal computers may work offline, and may bill vehicles according to the charging parameters, or waive fees for some vehicles according to the special authorizations. Further, the lane industrial personal computers may control lane peripheral devices, lane peripheral device 103-1 and lane peripheral device 103-2. For example, the lane industrial personal computer may control a barrier to rise when it is determined that the vehicle is charged successfully, so that the vehicle passes through a current lane, and the lane industrial personal computer may control the barrier to fall after the vehicle has passed through the current lane. Further, the lane industrial personal computer may upload the charging information of the vehicle to the station-level charging server.

As mentioned above, in the conventional lane charging system, the lane industrial personal computer needs to be disposed in each lane, causing the problem of complicated deployment of the lane industrial personal computers. In addition, the lane industrial personal computer has limited computing capability, that is, the lane industrial personal computer has the problem of low billing efficiency.

Through the technical solutions provided by embodiments of the disclosure, a situation of deploying a lane industrial personal computer in each lane can be avoided, thus avoiding the problem of complicated deployment of the lane industrial personal computers. In addition, compared with the computing capability of the lane industrial personal computer, the server has powerful computing capability, so that a large amount of data from the lanes may be processed faster and thus the billing efficiency can be improved.

In order to solve this technical problem, some embodiments implement a whole vehicle billing process through a server, including: a vehicle billing process and a process of controlling a lane peripheral system. In this way, it is not necessary to deploy the lane industrial personal computer in each lane, so that the complexity of the deployment of the lane industrial personal computers can be reduced; in addition, compared with the computing capability of the lane industrial personal computer, the server has powerful computing capability, so that the billing efficiency can be improved.

In addition, a billing function and a control function of the server may be divided, so that the billing of the server may be lightened, unified and centralized. Moreover, if it is necessary to upgrade or replace the lane peripheral system or some components in the system, such upgrading or replacement operation does not affect the use of the billing module due to independent settings of the billing module and the control module, so that the reliability of the vehicle billing system can be improved. Further, some embodiments further provide an intermediate module, and the intermediate module may be adapted to different lane peripheral systems, so that software or hardware differences of different lane peripheral systems may be masked. If the lane peripheral system or some components in the system need to be upgraded or replaced, the server or the billing module does not need to be improved or upgraded accordingly, so that the upgrade cost of the vehicle billing system is saved.

It is to be understood that a technical solution provided by some embodiments may be applied to the following scenarios, but is not limited thereto.

Figure 2:
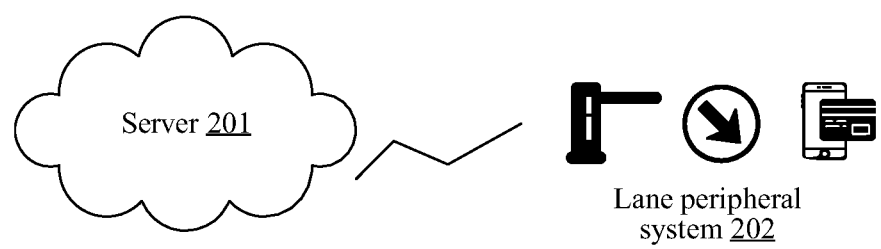
FIG. 2 is a diagram of an application scenario according to some embodiments.

FIG. 2 is a diagram of an application scenario according to some embodiments. As shown in FIG. 2, a server 201 may store information such as charging parameters, special authorizations or the like, and may bill the vehicle. After determining that the vehicle is charged successfully (that a toll transaction is successful), the server may control a lane peripheral system 202. For example, when determining that the toll transaction is successful, the server may control a barrier to rise, and control a lane display screen to display charging information and a traffic light to be displayed in a first preset color. After determining that the vehicle passes through a current lane, the server may control the barrier to fall, control the lane display screen to clear currently displayed contents, and control the traffic light to be displayed in a second preset color, and so on. In some embodiments, the server may waive fees for some vehicles according to the special authorizations, and further, the server may control the lane peripheral system to release such vehicles.

It is to be understood that the interconnection communication between the server and the lane peripheral system uses a cloud Internet of Things (IoT) technology.

The IoT refers to a network which achieves ubiquitous connection between objects and objects, and between objects and people, and achieves intelligent perception, recognition and management of objects and processes through various possible network access, by collecting any objects or processes requiring monitoring, connection and interaction in real time through various devices and technologies such as various information sensors, radio frequency identification technologies, global positioning systems, infrared sensors, laser scanners or the like, and collecting various needed information such as sound, light, heat, electricity, mechanics, chemistry, biology, location or the like of the objects. The IoT is an information carrier based on the Internet and a conventional telecommunication network, which enables all ordinary physical objects that can be independently addressed to form an interconnected network.

Cloud IoT aims to connect information sensed and instructions received by a sensing device in the conventional Internet of Things to the Internet to truly achieve networking, and implement massive data storage and calculation through a cloud computing technology. Since the characteristic of the IoT is the connection between objects and objects, in a process of sensing current running states of the "objects" in real time, a large amount of data information will be generated. How to summarize the information and how to screen and acquire useful information from massive information to make a decision support for subsequent development have become a key issue affecting the development of the IoT. Therefore, the cloud IoT based on the cloud computing and cloud storage technologies has become a strong support for the technology and application of the IoT.

Figure 3:
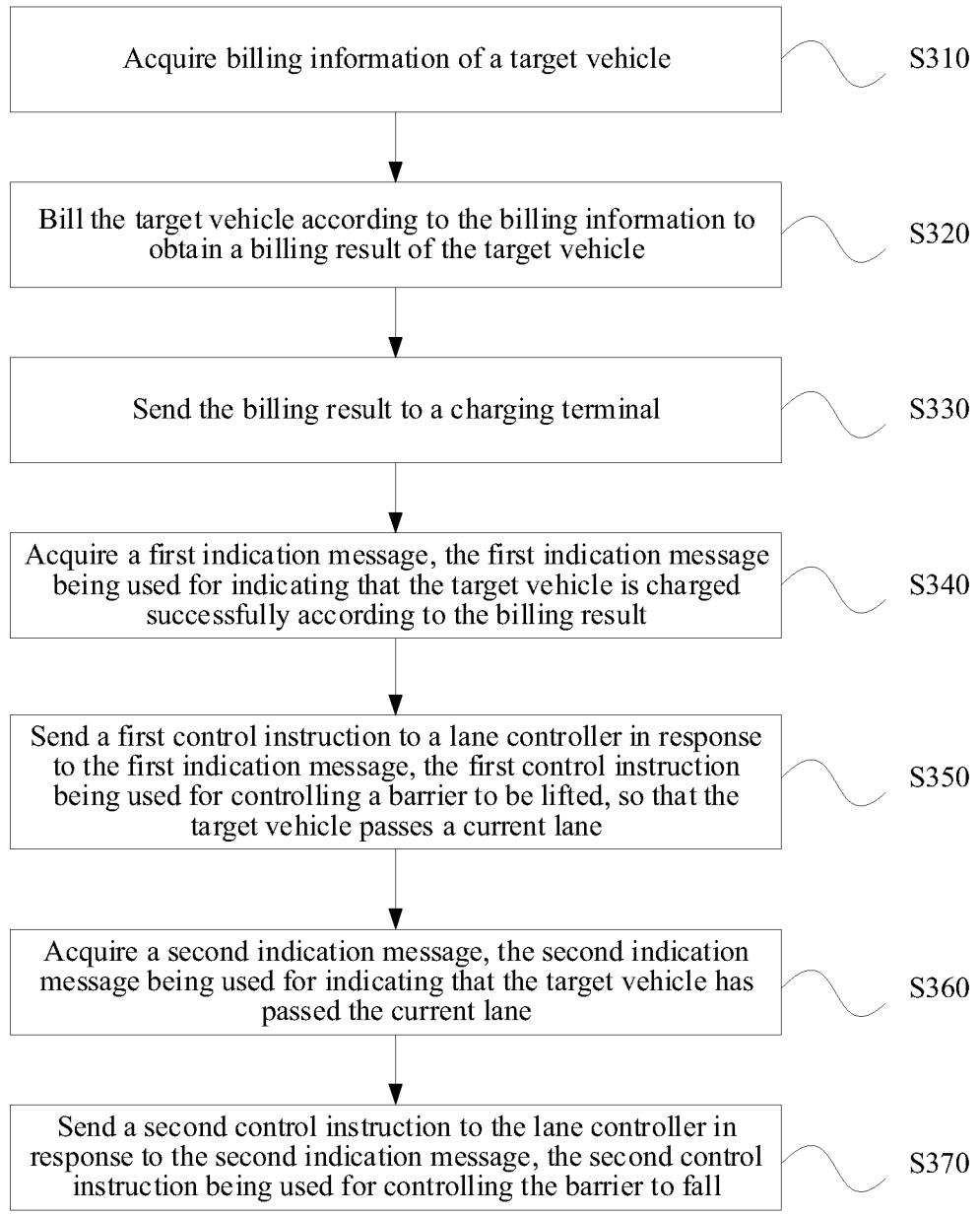
FIG. 3 is a flowchart of a vehicle charging method according to some embodiments.

FIG. 3 is a flowchart of a vehicle charging method according to some embodiments, which may be performed by a server. As shown in FIG. 3, the method may include the following operations:

S310: acquiring billing reference information (also referred to as reference information) of a vehicle to be charged, i.e., the vehicle in a current toll lane;

S320: billing the vehicle to be charged according to the billing reference information to obtain charging information of the vehicle to be charged; and S330: sending the charging information (also referred to as toll information) to a charging terminal;

S340: acquiring a first indication message, the first indication message being used for indicating that the vehicle to be charged is successfully charged according to the charging information;

S350: sending a first control instruction to a lane controller in response to the first indication message, the first control instruction being used for controlling a barrier to rise, so that the vehicle to be charged passes through a current lane;

S360: acquiring a second indication message, the second indication message being used for indicating that the vehicle to be charged has passed through the current lane; and S370: sending a second control instruction to the lane controller in response to the second indication message, the second control instruction being used for controlling the barrier to lower.

In some embodiments, the server may acquire billing reference information of the vehicle to be charged from a card reading device, and the billing reference information includes at least a vehicle type and driving information of the vehicle to be charged. In some embodiments, the billing reference information may further include vehicle identification. The vehicle types may include: small vehicles, medium-sized vehicles, large vehicles, extra-large vehicles, and the like. The driving information may include a mileage, information of an entrance station entering an expressway, and the like.

It is to be understood that the card reading device may read the data in an electronic toll collection (ETC) card or a self-service compound pass card (CPC), so as to acquire billing reference information of the vehicle to be charged, but it is not limited thereto.

It is to be understood that information such as the charging parameters and the special authorizations may be stored in the server, and this special authorization may be a toll-free authorization for some special vehicles, but it is not limited thereto. The charging parameters include charging standards for different types of vehicles, for example, the charging standard for small vehicles is 0.45 RMB per kilometer; the charging standard for medium-sized vehicles is 0.9 RMB per kilometer. For the vehicle with the special authorization, the server may directly control the barrier to rise, the lane display screen to display the charging information, the traffic light to be displayed in the first preset color, and so on; and after the vehicle passes through the current lane, the server may control the barrier to lower, the lane display screen to clear currently displayed contents, and the traffic light to be displayed in the second preset color, and so on.

For the vehicle without the special authorization, such as the above-mentioned vehicle to be charged, the server may bill the vehicle to be charged based on the billing reference information and charging parameters of the vehicle to be charged to obtain the charging information of the vehicle to be charged. The charging information includes at least a charge amount, i.e., a toll or a cost. In some embodiments, the server may acquire the charging standard corresponding to the vehicle type based on the vehicle type and charging parameters in the billing reference information, and then determine the charging information using the charging standard and the mileage corresponding to the vehicle type. For example, if the vehicle type of the vehicle to be charged is a small vehicle and the mileage is 200 kilometers, then the charging standard of the small vehicle is determined as 0.45 RMB per kilometer according to the charging parameters, and then the charging information of the vehicle to be charged is determined as 90 RMB using the mileage and the charging standard of the small vehicle.

In some embodiments, after the charging terminal receives the charging information of the vehicle to be charged, based on different payment modes, the server may undergo the following situations of acquiring the first indication message, but it is not limited thereto:

Situation 1: Assuming that a driver adopts a cash payment mode, a toll collector needs to perform charging operation on a charging terminal, and after successful charging, the charging terminal may send the first indication message to the server to indicate to the server that the vehicle to be charged is charged successfully.

Situation 2: Assuming that a driver adopts a code scanning payment mode, after the driver completes code-scanning payment, a third-party payment server may send a first indication message to the server to indicate to the server that the vehicle to be charged is charged successfully.

In some embodiments, after the driver completes the code-scanning payment, the third-party payment server may send a transaction bill to a terminal device held by the driver.

Situation 3: Assuming that a driver adopts an ETC payment mode, after automatic deduction of the vehicle to be charged is completed, an ETC server may send the first indication message to the server to indicate to the server that the vehicle to be charged is charged successfully.

In some embodiments, when the driver pays through ETC, the ETC server may send the transaction bill to the terminal device held by the driver, or send a transaction bill in a settlement period to the terminal device held by the driver at the end of this settlement period.

In some embodiments, the lane peripheral system may include: a lane controller, a lane display screen, a barrier, traffic lights, and the like, but is not limited thereto.

In some embodiments, after the server determines that the vehicle to be charged is charged successfully according to the first indication message, the server, in addition to controlling the barrier to rise through the first control instruction, may control at least one of the following operations: allowing a lane display screen to display charging information, and allowing a traffic light to be displayed in a first preset color, where the first preset color may be a passable color, such as green, but it is not limited thereto.

In some embodiments, assuming that the driver adopts the code-scanning payment mode, the server may also control the lane display screen to display a payment identification code, which may be a two-dimensional identification code, but is not limited thereto.

In some embodiments, the server may also control the lane display screen to display auxiliary charging information such as a driving path of the vehicle to be charged through the first control instruction, but it is not limited thereto.

It is to be understood that after the server determines that the vehicle to be charged is charged successfully according to the first indication message, the server may simultaneously control several of the following operations according to the first control instruction: allowing the barrier to lift, allowing the lane display screen to display the charging information, allowing the traffic light to be displayed in the first preset color, allowing the lane display screen to display the auxiliary charging information such as the driving path of the vehicle to be charged. However, in fact, the server may also independently control the following operations: allowing the barrier to lift, allowing the lane display screen to display the charging information, allowing the traffic light to be displayed in the first preset color, allowing the lane display screen to display the payment code, allowing the lane display screen to display the auxiliary charging information such as the driving path of the vehicle to be charged. The server may use one control instruction to control a part of the following operations and another control instruction to control another part of the following operations: allowing the barrier to lift, allowing the lane display screen to display the charging information, allowing the traffic light to be displayed in the first preset color, allowing the lane display screen to display the payment code, allowing the lane display screen to display the auxiliary charging information such as the driving path of the vehicle to be charged. In short, how the server controls the lane peripheral system is not limited in herein.

In some embodiments, when the lane controller detects that the vehicle to be charged has passed through the current lane, the lane controller may send a second indication message to the server to indicate that the vehicle to be charged has passed through the current lane.

In some embodiments, after the server determines that the vehicle to be charged has passed through the current lane according to the second indication message, the server, in addition to controlling the barrier to fall through the second control instruction, may control at least one of the following operations: allowing the lane display screen to clear currently displayed contents, and allowing the traffic light to be displayed in a second preset color, where the second preset color may indicate a non-passing color, such as red, but is not limited thereto.

In some embodiments, after the server receives the second indication message, the server stores the charging information in response to the second indication message.

In some embodiments, after the server receives the second indication message, the server sends a third control instruction to the charging terminal in response to the second indication message, the third control instruction being used for controlling the charging terminal to clear displayed contents of a display screen of the charging terminal.

It is to be understood that after the server determines that the vehicle to be charged has passed through the current lane according to the second indication message, the server may simultaneously control several of the following operations according to the second indication message: allowing the barrier to fall, allowing the lane display screen to clear currently displayed contents, and allowing the traffic light to be displayed in the second preset color. However, in fact, the server may also independently control the following operations: allowing the barrier to fall, allowing the lane display screen to clear currently displayed contents, allowing the traffic light to be displayed in the second preset color, and so on. The server may use one control instruction to control a part of the following operations and another control instruction to control another part of the following operations: allowing the barrier to fall, allowing the lane display screen to clear currently displayed contents, allowing the traffic light to be displayed in the second preset color. In short, how the server controls the lane peripheral system is not limited herein.

In some embodiments, the server may implement a whole vehicle billing process, including: a vehicle billing process and a process of controlling the lane peripheral system. In this way, it is not necessary to deploy the lane industrial personal computer in each lane, so that the complexity of the deployment of the lane industrial personal computers can be reduced; in addition, compared with the computing capability of the lane industrial personal computer, the server has powerful computing capability, so that the billing efficiency can be improved.

It is to be understood that the technical solution provided in some embodiments may also be combined with a billing mode based on the lane industrial personal computer; since the lane industrial personal computer has the characteristic of working offline, during a network failure, vehicle billing may be performed based on the lane industrial personal computer, and when the network is normal, the vehicle billing may be performed based on the technical solution provided in this embodiment of this application. On the one hand, the billing reliability of the vehicle billing system can be improved. On the other hand, the billing flexibility of the vehicle billing system can be improved.

Figure 4:
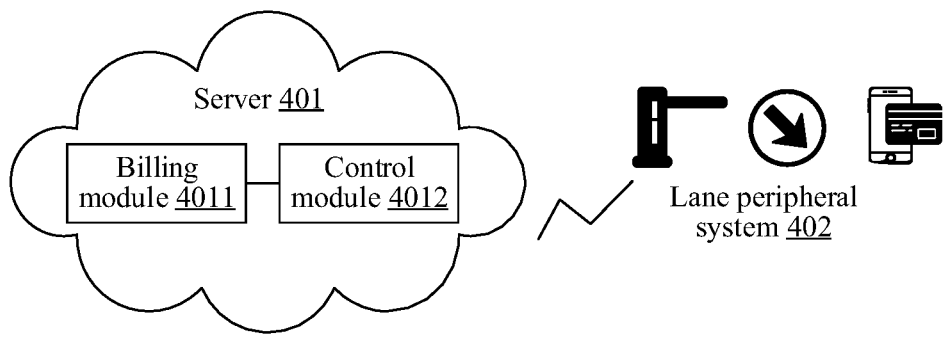
FIG. 4 is a schematic diagram of a lane charging system according to some embodiments

In some embodiments, in order to improve the lightweight, unified and centralized billing of the server, a billing function and a control function of the server may be divided. For example, as shown in FIG. 4, the server 401 may include: a billing module 4011 and a control module 4012, the billing module being configured to bill a vehicle to be charged, the control module being configured to implement communication between the billing module and the lane peripheral system 402 so as to control the billing and traffic of the vehicle to be charged.

It is to be understood that since the control module is configured to implement the communication between the billing module and the lane peripheral system, that is, the control module may implement the function of IoT access, the control module may also be called an IoT service module.

Figure 5:
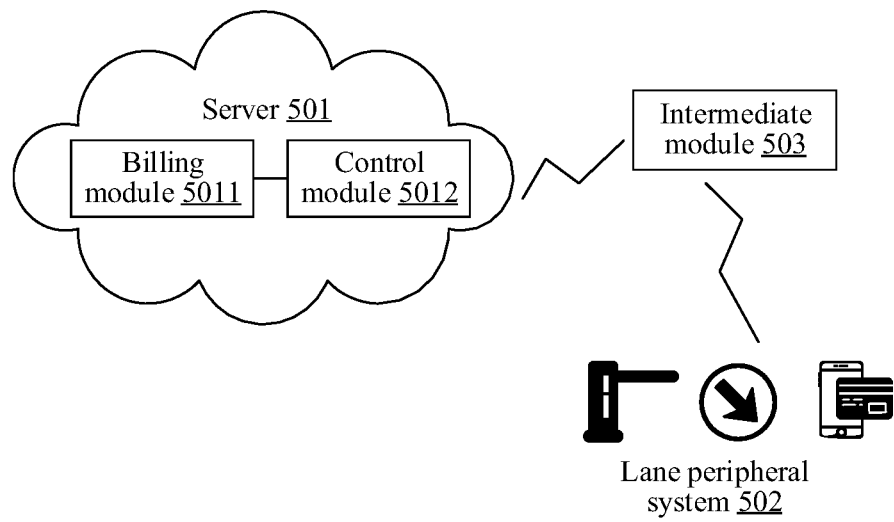
FIG. 5 is a schematic diagram of another lane charging system according to some embodiments

In some embodiments, in order to mask software or hardware differences of different lane peripheral systems and adapt to different lane peripheral systems, the vehicle billing system provided in this embodiment of this application may include a server 501, a lane peripheral system 502 and an intermediate module 503. The server 501 may include a billing module 5011 and a control module 5012. As shown in FIG. 5, the intermediate module 503 is disposed between the control module 5012 and the lane peripheral system 502, the control module 5012 is configured to implement the communication between the billing module 5011 and the intermediate module 503, and the intermediate module 503 is configured to implement the communication between the control module 5012 and the lane peripheral system 502.

In some embodiments, the intermediate module may be included in the server. For example, the intermediate module may be a software module in the server, and the software module includes software instructions for adapting to different lane peripheral systems. In some embodiments, the intermediate module is independent of the server. For example, the intermediate module is a hardware device independent of the server, and the hardware device is loaded with software instructions for adapting to different lane peripheral systems. The hardware device may be an intelligent device such as a desktop computer, a notebook computer, a personal computer (PC) or the like, which is not limited thereto. An example embodiment in which the intermediate module is independent of the server is shown in FIG. 5.

The technical solution of some embodiments of the disclosure will be described in combination with the module division of the server and the setting of the intermediate module below.

Figure 6:
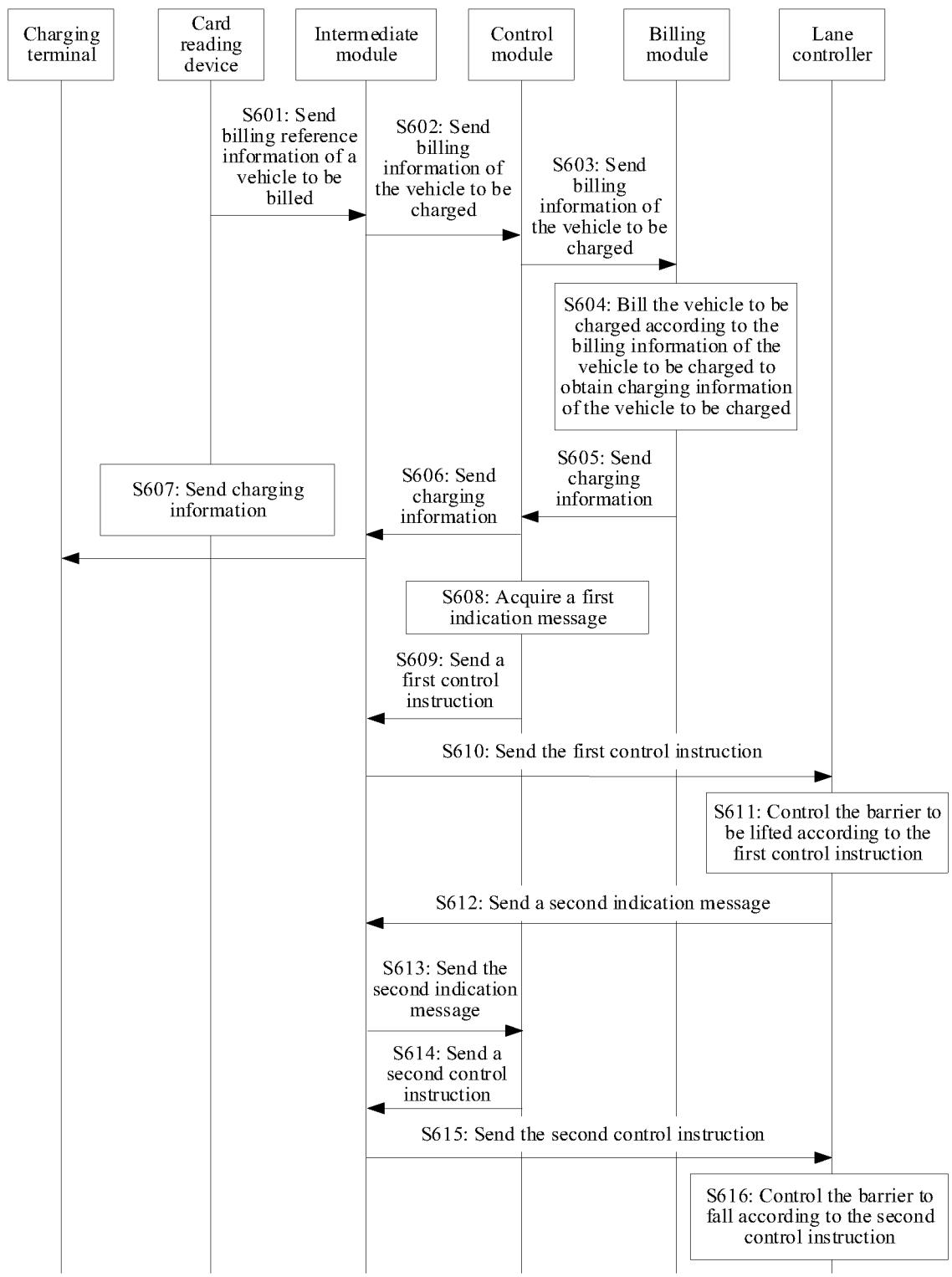
FIG. 6 is an interactive flowchart of another vehicle charging method according to some embodiments.

FIG. 6 is an interactive flowchart of another vehicle charging method according to some embodiments. This method may be jointly performed by the card reading device, the lane controller, the intermediate module, and the billing module and the control module in the server, but is not limited thereto. As shown in FIG. 6, this method may include the following operations:

S601: the card reading device sends billing reference information of a vehicle to be charged to the intermediate module;

S602: the intermediate module sends the billing reference information of the vehicle to be charged to the control module;

S603: the control module sends the billing reference information of the vehicle to be charged to the billing module;

S604: the billing module bills the vehicle to be charged according to the billing reference information of the vehicle to be charged to obtain charging information of the vehicle to be charged;

S605: the billing module sends the charging information to the control module;

S606: the control module sends the charging information to the intermediate module;

S607: the intermediate module sends the charging information to the charging terminal;

S608: the control module acquires a first indication message;

S609: the control module sends a first control instruction to the intermediate module in response to the first indication message, the first control instruction being used for controlling a barrier to lift, so that the vehicle to be charged passes through a current lane;

S610: the intermediate module sends the first control instruction to the lane controller;

S611: the lane controller controls the barrier to lift according to the first control instruction;

S612: the lane controller sends a second indication message to the intermediate module, the second indication message being used for indicating that the vehicle to be charged has passed through the current lane;

S613: the intermediate module sends the second indication message to the control module;

S614: the control module sends a second control instruction to the intermediate module in response to the second indication message, the second control instruction being used for controlling the barrier to fall;

S615: the intermediate module sends the second control instruction to the lane controller; and S616: the lane controller controls the barrier to fall according to the second control instruction.

The card reading device may read the data in the ETC card or the self-service CPC, so as to acquire billing reference information of the vehicle to be charged. The server may acquire billing reference information of the vehicle to be charged from the card reading device, and the billing reference information includes at least a vehicle type and driving information of the vehicle to be charged, but is not limited thereto.

The server may further include a storage module, the storage module may be configured to store lane configuration files, for example, to store information such as charging parameters, special authorizations or the like, and in some embodiments, the storage module is further configured to store charging information of the vehicle to be charged. This special authorization may be a toll-free authorization for some special vehicles, but it is not limited thereto. For the vehicle with the special authorization, the control module may directly control the barrier to lift, the lane display screen to display the charging information, the traffic light to be displayed in the first preset color to prompt the vehicle to be charged to pass through the current lane, and so on; and after detecting that the vehicle has passed through the current lane, the control module may control the barrier to fall, the lane display screen to clear currently displayed contents, and the traffic light to be displayed in the second preset color, and so on. For the vehicle without the special authorization, such as the above-mentioned vehicle to be charged, the billing module may bill the vehicle to be charged based on the billing reference information and charging parameters of the vehicle to be charged to obtain the charging information of the vehicle to be charged.

In some embodiments, after the card reading device receives the charging information of the vehicle to be charged, based on different payment modes, the control module may undergo the following situations of acquiring the first indication message, but it is not limited thereto.

Situation 1: Assuming that a driver adopts a cash payment mode, the toll collector needs to perform charging operation on a charging terminal, and after successful charging, the charging terminal may send the first indication message to the control module to indicate to the server that the vehicle to be charged is charged successfully, where the charging terminal may send the first indication message to the control module through the intermediate module, or directly send the first indication message to the control module, which is not limited in this embodiment of this application.

Situation 2: Assuming that a driver adopts a code-scanning payment mode, after the driver completes code-scanning payment, the third-party payment server may send the first indication message to the control module to indicate to the control module that the vehicle to be charged is charged successfully, where the third-party payment server may send the first indication message to the control module through the intermediate module, or directly send the first indication message to the control module, which is not limited in this embodiment of this application.

In some embodiments, after the driver completes the code-scanning payment, the third-party payment server may send a transaction bill to a terminal device held by the driver.

Situation 3: Assuming that a driver adopts an ETC payment mode, after automatic deduction of the vehicle to be charged is completed, the ETC server may send the first indication message to the control module, so as to indicate to the control module that the vehicle to be charged is charged successfully, where the ETC server may send the first indication message to the control module through the intermediate module, or directly send the first indication message to the ETC server, which is not limited thereto.

In some embodiments, when the driver pays through ETC, the ETC server may send the transaction bill to the terminal device held by the driver, or send all transaction bills in a settlement period to the terminal device held by the driver at the end of this settlement period.

In some embodiments, the lane peripheral system may include: a lane controller, a lane display screen, a barrier, traffic lights, and the like, but is not limited thereto.

In some embodiments, after the control module determines that the vehicle to be charged is charged successfully according to the first indication message, the control module, in addition to controlling the barrier to lift through the first control instruction, may control at least one of the following operations: allowing a lane display screen to display charging information, and allowing a traffic light to be displayed in a first preset color, but it is not limited thereto.

In some embodiments, assuming that the driver adopts the code-scanning payment mode, the control module may also control the lane display screen to display a payment identification code through a first control instruction, which may be a two-dimensional identification code, but is not limited thereto.

In some embodiments, the control module may also control the lane display screen to display auxiliary charging information such as a driving path of the vehicle to be charged through the first control instruction, but it is not limited thereto.

It is to be understood that after the control module determines that the vehicle to be charged is charged successfully according to the first indication message, the control module may simultaneously control several of the following operations according to the first control instruction: allowing the barrier to lift, allowing the lane display screen to display the charging information, allowing the traffic light to be displayed in the first preset color, allowing the lane display screen to display the auxiliary charging information such as the driving path of the vehicle to be charged. The control module may also independently control the following operations: allowing the barrier to lift, allowing the lane display screen to display the charging information, allowing the traffic light to be displayed in the first preset color, allowing the lane display screen to display the auxiliary charging information such as the driving path of the vehicle to be charged. In some embodiments, the control module may use one control instruction to control a part of the following operations and other control instruction to control another part of the following operations: allowing the barrier to lift, allowing the lane display screen to display the charging information, allowing the traffic light to be displayed in the first preset color, allowing the lane display screen to display the payment code, allowing the lane display screen to display the auxiliary charging information such as the driving path of the vehicle to be charged. In short, how the server controls the lane peripheral system is not limited herein.

In some embodiments, when the lane controller detects that the vehicle to be charged has passed through the current lane, the lane controller may send a second indication message to the control module through the intermediate module to indicate that the vehicle to be charged has passed through the current lane.

In some embodiments, after the control module determines that the vehicle to be charged has passed through the current lane according to the second indication message, the control module, in addition to controlling the barrier to fall through the second control instruction, may control at least one of the following operations: allowing the lane display screen to clear the currently displayed contents (that is, clears the screen), and allowing the traffic light to be displayed in the second preset color, but it is not limited thereto.

In some embodiments, after receiving the second indication message, the control module stores the charging information in responses to the second indication message, for example, the control module stores the charging information in the storage module.

In some embodiments, after receiving the second indication message, the control module sends a third control instruction to the charging terminal in response to the second indication message, the third control instruction being used for controlling the charging terminal to clear displayed contents of a display screen of the charging terminal, where the control module may directly send the third control instruction to the charging terminal, or the control module may send the third control instruction to the charging terminal through the intermediate module, which is not limited herein.

It is to be understood that, as described above, after the control module determines that the vehicle to be charged has passed through the current lane according to the second indication message, the control module may simultaneously control several of the following operations according to the second indication message: allowing the barrier to fall, allowing the lane display screen to clear currently displayed contents, and allowing the traffic light to be displayed in the second preset color. The control module may also independently control the following operations: allowing the barrier to fall, allowing the lane display screen to clear currently displayed contents, allowing the traffic light to be displayed in the second preset color, and so on. Alternatively, the control module may use one control instruction to control a part of the following operations and another control instruction to control another part of the following operations: allowing the barrier to fall, allowing the lane display screen to clear currently displayed contents, allowing the traffic light to be displayed in the second preset color. In short, how the control module controls the lane peripheral system is not limited herein.

To sum up, in some embodiments, the billing function and the control function of the server may be divided, so that the lightweight, unified and centralized billing of the server may be improved Moreover, if it is necessary to upgrade or replace the lane peripheral system or some components in the system, such upgrading or replacement operation does not affect the use of the billing module due to independent settings of the billing module and the control module, so that the reliability of the billing system can be improved. In addition, some embodiments further provide an intermediate module, and the intermediate module may be adapted to different lane peripheral systems, so that software or hardware differences of different lane peripheral systems may be masked. If the lane peripheral system or some components in the system need to be upgraded or replaced, the server or the billing module does not need to be improved or upgraded accordingly, so that the upgrade cost of the billing system is saved.

Figure 7:
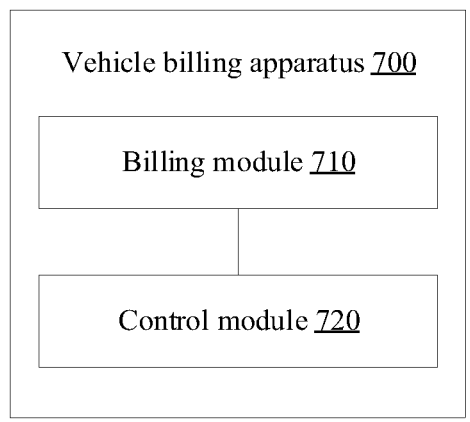
FIG. 7 is a schematic diagram of a vehicle charging apparatus 700 according to some embodiments.

FIG. 7 is a schematic diagram of a vehicle charging apparatus 700 according to some embodiments. As shown in FIG. 7, the apparatus 700 may include: a billing module, also referred to as a transaction module, 710 and a control module 720; where the billing module 710 is configured to: acquire billing reference information of a vehicle to be charged; bill the vehicle to be charged according to the billing reference information to obtain charging information of the vehicle to be charged; and send the charging information to a charging terminal; and the control module 720 is configured to: acquire a first indication message, the first indication message being used for indicating that the vehicle to be charged is successfully charged according to the charging information; send a first control instruction to a lane controller in response to the first indication message, the first control instruction being used for controlling a barrier to lift, so that the vehicle to be charged passes through a current lane; acquire a second indication message, the second indication message being used for indicating that the vehicle to be charged has passed through the current lane; and send a second control instruction to the lane controller in response to the second indication message, the second control instruction being used for controlling the barrier to fall.

In some embodiments, the control module 720 is configured to implement the communication between the billing module 710 and the intermediate module, the intermediate module being used for the communication between the control module 720 and the lane peripheral system; where the intermediate module may be adapted to different lane peripheral systems.

In some embodiments, the intermediate module is located within the server, or the intermediate module is independent of the server.

In some embodiments, the first control instruction is further used for controlling at least one of the following operations: allowing a lane display screen to display charging information, and allowing a traffic light to be displayed in a first preset color.

In some embodiments, the control module 720 is further configured to: determine a payment mode corresponding to a vehicle to be charged; and control a lane display screen to display a payment identification code in a case that the payment mode is a code-scanning payment mode.

In some embodiments, the control module 720 is configured to: receive the first indication message sent by the charging terminal; or, receive the first indication message sent by the third-party payment server; or, receive the first indication message sent by the ETC server.

In some embodiments, the control module 720 is further configured to: store the charging information in response to the second indication message.

In some embodiments, the control module 720 is further configured to: send a third control instruction to the charging terminal in response to the second indication message, the third control instruction being used for controlling the charging terminal to clear displayed contents of a display screen of the charging terminal.

In some embodiments, the second control instruction is further used for controlling at least one of the following operations: allowing the lane display screen to clear currently displayed contents, and allowing the traffic light to be displayed in a second preset color.

It is to be understood that the apparatus embodiment and the method embodiment may correspond to each other, and similar description may refer to the method embodiment. The apparatus 700 shown in FIG. 7 may perform the foregoing method embodiment, and the above-mentioned and other operations and/or functions of the various modules in the apparatus 700 are respectively for implementing the corresponding processes in the foregoing methods.

The apparatus 700 of this embodiment of this application has been described above from the perspective of functional modules in conjunction with the attached drawings. It is to be understood that the functional module may be implemented in hardware form, software instruction form (code), or a combination of hardware and software modules. In some embodiments, the various operations of the method may be completed by an integrated logic circuit of hardware and/or an instruction in the form of software in the processor, and the operations of the method disclosed in some embodiments may be directly performed and completed by a hardware decoding processor, or may be performed and completed by using a combination of hardware and software modules in the decoding processor. In some embodiments, the software module may be located in a storage medium that is mature in the art, such as a random access memory (RAM), a flash memory, a read-only memory (ROM), a programmable ROM, an electrically erasable programmable memory, or a register. The storage medium is located in the memory. The processor reads information in the memory and completes the operations of the foregoing method embodiments in combination with hardware thereof.

Figure 8:
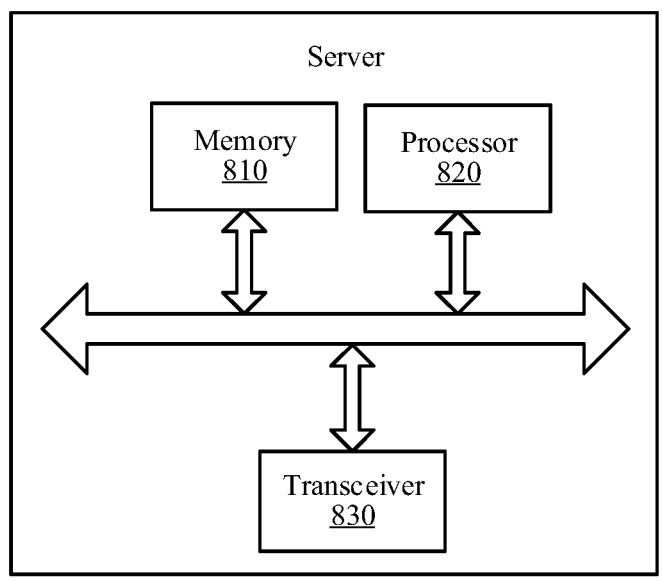
FIG. 8 is a schematic block diagram of a server 800 according to some embodiments.

FIG. 8 is a schematic block diagram of a server 800 according to some embodiments.

As shown in FIG. 8, the server 800 may include:
a memory 810 and a processor 820, the memory 810 being configured to store a computer program and transmit the program code to the processor 820. In other words, the processor 820 may invoke and run a computer program from the memory 810 to implement the method in this embodiment of this application.

For example, the processor 820 may be configured to perform the foregoing method embodiments according to instructions in the computer program.

In some embodiments, the processor 820 may include, but is not limited to:
a general purpose processor, a digital signal processor (DSP), an application specific integrated circuit (ASIC), a field programmable gate array (FPGA), or other programmable logic devices, discrete gate or transistor logic devices, and discrete hardware components, etc.

In some embodiments, the memory 810 includes, but is not limited to:
a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM), are available.

In some embodiments, the computer program may be divided into one or more modules, and the one or more modules are stored in the memory 810 and executed by the processor 820 to complete the method provided by this application. The one or more modules may be a series of computer program instruction segments that can complete specific functions, and the instruction segments are used for describing an execution process of the computer program in the server.

As shown in FIG. 8, the server may further include:
a transceiver 830, where the transceiver 830 may be connected to the processor 820 or the memory 810.

The processor 820 may control the transceiver 830 to communicate with other devices, and in some embodiments, may send information or data to other devices, or receive information or data sent by other devices. The transceiver 830 may include a transmitter and a receiver. The transceiver 830 may further include antennas, and the number of the antennas may be one or more.

It is to be understood that various components in the server are connected through a bus system, where in addition to a data bus, the bus system further includes a power bus, a control bus and a status signal bus.

Some embodiments of the disclosure further provide a vehicle billing system, including: a server configured to perform the vehicle charging method, and a lane peripheral system. The server may include: an intermediate module which can be adapted to different lane peripheral systems. In some embodiments, the vehicle billing system further includes: an intermediate device, where the intermediate device includes the intermediate module which can be adapted to different lane peripheral systems.

Some embodiments of the disclosure further provide a computer storage medium, having stored a computer program thereon, the computer program, when executed by a computer, causing the computer to perform the method of the foregoing method embodiment. Some embodiments further provide a computer program product including instructions, the instructions, when executed by a computer, causing the computer to perform the method of the foregoing method embodiments.

When software is used for implementation, implementation may be entirely or partially performed in the form of a computer program product. The computer program product includes one or more computer instructions. When the program instruction of the computer is loaded and executed on the computer, all or some of the operations are generated according to the process or function described in the embodiments of this application. The computer may be a general-purpose computer, a special-purpose computer, a computer network, or other programmable apparatus. The computer instructions may be stored in a computer readable storage medium or transmitted from one computer readable storage medium to another computer readable storage medium. For example, the computer instructions may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer readable storage medium may be any available medium capable of being accessed by a computer or include one or more data storage devices integrated by one or more available media, such as a server and a data center. The available medium may be a magnetic medium (such as a floppy disk, a hard disk, or a magnetic tape), an optical medium (such as a digital video disc (DVD)), a semiconductor medium (such as a solid state disk (SSD)) or the like. The storage medium may be a volatile memory, a non-volatile memory, a transitory memory, and a non-transitory memory.

A person of ordinary skill in the art may notice that the exemplary modules and algorithm operations described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of the disclosure.

In several embodiments, it is to be understood that the disclosed system, apparatus, and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, that is, they may be located in one position, or may be distributed on a plurality of network modules. Some or all of the modules may be selected according to actual needs to achieve the objectives of the implementations. For example, functional modules in the embodiments of this application may be integrated into one processing module, or each of the modules may exist alone physically, or two or more modules are integrated into one module.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A vehicle toll charging method comprising:
    performing, by a server comprising a computer system, steps comprising:
        acquiring reference information of a vehicle in a current toll lane, the reference information comprising at least a vehicle type and driving information;
        determining toll information of the vehicle according to the reference information;
        determining a payment mode corresponding to the vehicle in the current toll lane;
        controlling a lane display screen to display a payment identification code based on the payment mode being a code scanning payment mode;
        transmitting the toll information to a charging terminal;
        acquiring a first indication message, the first indication message indicating that a toll transaction of the vehicle is successful;
        transmitting a first control instruction to a lane controller based on the first indication message to control a barrier of the current toll lane to lift and allow the vehicle to pass through the current toll lane;
        acquiring a second indication message, the second indication message indicating that the vehicle has passed through the current toll lane; and
        transmitting a second control instruction to the lane controller based on the second indication message to control the barrier to lower.

2. The vehicle toll charging method according to claim 1, wherein the first control instruction controls at least one of: the lane display screen to display the toll information, and a traffic light to be displayed in a first preset color.

3. The vehicle toll charging method according to claim 2, wherein the second control instruction controls at least one of: allowing the lane display screen to clear currently displayed contents, and allowing the traffic light to be displayed in a second preset color.

4. The vehicle toll charging method according to claim 1, wherein acquiring the first indication message comprises at least one of:
    receiving the first indication message transmitted by the charging terminal;
    receiving the first indication message transmitted by a third-party payment server; or,
    receiving the first indication message transmitted by an electronic toll collection (ETC) server.

5. The vehicle toll charging method according to claim 1, wherein the vehicle toll charging method further comprises:
    storing the toll information based on the second indication message.

6. The vehicle toll charging method according to claim 1, wherein the vehicle toll charging method further comprises:
    transmitting a third control instruction to the charging terminal based on the second indication message, to control the charging terminal to clear displayed contents of the lane display screen of the charging terminal.

7. A vehicle toll charging apparatus comprising:
    at least one memory configured to store program code; and
    at least one processor configured to read the program code and operate as instructed by the program code, the program code comprising:
    transaction code configured to cause at least one of the at least one processor to:
        acquire reference information of a vehicle in a current toll lane, the reference information comprising at least a vehicle type and driving information,
        determine toll information of the vehicle according to the reference information,
        determine a payment mode corresponding to the vehicle in the current toll lane,
        control the lane display screen to display a payment identification code based on the payment mode being a code scanning payment mode, and
        transmit the toll information to a charging terminal; and
    control code configured to cause at least one of the at least one processor to:
        acquire a first indication message, the first indication message indicating that a toll transaction of the vehicle is successful,
        transmit a first control instruction to a lane controller based on the first indication message to control a barrier of the current toll lane to lift and allow the vehicle to pass through the current toll lane,
        acquire a second indication message, the second indication message indicating that the vehicle has passed through the current toll lane, and
        transmit a second control instruction to the lane controller based on the second indication message to control the barrier to lower.

8. The vehicle toll charging apparatus according to claim 7, wherein the first control instruction controls at least one of: the lane display screen to display the toll information, and a traffic light to be displayed in a first preset color.

9. The vehicle toll charging apparatus according to claim 8, wherein the second control instruction controls at least one of: allowing the lane display screen to clear currently displayed contents, and allowing the traffic light to be displayed in a second preset color.

10. The vehicle toll charging apparatus according to claim 7, wherein the control code is further configured to cause at least one of the at least one processor to:
receive the first indication message transmitted by the charging terminal;
receive the first indication message transmitted by a third-party payment server; or,
receive the first indication message transmitted by an electronic toll collection (ETC) server.

11. The vehicle toll charging apparatus according to claim 7, wherein the control code is further configured to cause at least one of the at least one processor to:
store the toll information based on the second indication message.

12. The vehicle toll charging apparatus according to claim 7, wherein the control code is further configured to cause at least one of the at least one processor to:
transmit a third control instruction to the charging terminal based on the second indication message to control the charging terminal to clear displayed contents of the lane display screen of the charging terminal.

13. A non-transitory computer-readable storage medium storing computer code thereon which, when executed by at least one processor, causes the at least one processor to at least:
acquire reference information of a vehicle in a current toll lane, the reference information comprising at least a vehicle type and driving information;
determine toll information of the vehicle according to the reference information;
determine a payment mode corresponding to the vehicle in the current toll lane;
control the lane display screen to display a payment identification code based on the payment mode being a code scanning payment mode;
transmit the toll information to a charging terminal;
acquire a first indication message, the first indication message indicating that a toll transaction of the vehicle is successful;
transmit a first control instruction to a lane controller based on the first indication message to control a barrier of the current toll lane to lift and allow the vehicle to pass through the current toll lane;
acquire a second indication message, the second indication message indicating that the vehicle has passed through the current toll lane; and
transmit a second control instruction to the lane controller based on the second indication message to control the barrier to lower.

14. The non-transitory computer-readable storage medium according to claim 13, wherein the first control instruction controls at least one of: the lane display screen to display the toll information, and a traffic light to be displayed in a first preset color.

15. The non-transitory computer-readable storage medium according to claim 13, wherein acquire the first indication message comprises at least one of:
receiving the first indication message transmitted by the charging terminal;
receiving the first indication message transmitted by a third-party payment server; or,
receiving the first indication message transmitted by an electronic toll collection (ETC) server.

16. The non-transitory computer-readable storage medium according to claim 13, wherein the computer code further causes the at least one processor to at least:
store the toll information based on the second indication message.

17. The non-transitory computer-readable storage medium according to claim 13, wherein the computer code further causes the at least one processor to at least:
transmit a third control instruction to the charging terminal based on the second indication message, to control the charging terminal to clear displayed contents of the lane display screen of the charging terminal.

* * * * *